United States Patent
Haruki

(10) Patent No.: US 7,325,061 B2
(45) Date of Patent: Jan. 29, 2008

(54) SERVER SYSTEM AND IMAGE MANAGEMENT METHOD THEREOF

(75) Inventor: Toshinobu Haruki, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 628 days.

(21) Appl. No.: 10/101,594

(22) Filed: Mar. 21, 2002

(65) Prior Publication Data

US 2002/0135680 A1    Sep. 26, 2002

(30) Foreign Application Priority Data

Mar. 23, 2001  (JP) .............................. 2001-084314

(51) Int. Cl.
  *G06F 15/173* (2006.01)
  *G06F 15/167* (2006.01)
(52) U.S. Cl. ..................... 709/226; 709/213; 709/223; 709/225
(58) Field of Classification Search ........ 709/217–219, 709/223–224, 227, 245, 203, 213, 225–226
See application file for complete search history.

(56) References Cited

U.S. PATENT DOCUMENTS

| 6,282,362 B1 * | 8/2001 | Murphy et al. ............... 386/46 |
| 6,321,158 B1 * | 11/2001 | DeLorme et al. ........... 701/201 |
| 6,591,295 B1 * | 7/2003 | Diamond et al. ........... 709/217 |
| 6,636,259 B1 * | 10/2003 | Anderson et al. ......... 348/211.3 |
| 6,924,878 B2 * | 8/2005 | Garfinkle et al. ............. 355/40 |
| 6,952,281 B1 * | 10/2005 | Irons et al. ................. 358/1.15 |
| 6,964,025 B2 * | 11/2005 | Angiulo et al. ............. 715/838 |
| 7,013,288 B1 * | 3/2006 | Reifel et al. ................... 705/26 |

FOREIGN PATENT DOCUMENTS

| JP | 08-335034 | 12/1996 |
| JP | 10-293856 | 11/1998 |
| JP | 2000-228740 | 8/2000 |
| JP | 2000-324546 | 11/2000 |
| JP | 2001-060963 | 3/2001 |

OTHER PUBLICATIONS

Japanese article with partial translations entitled Publish Album on the Internet and Order Prints Over the Internet.
Japanese article with partial translation entitled Easier Search With Keyword.

\* cited by examiner

*Primary Examiner*—Ario Etienne
*Assistant Examiner*—Hussein A El-chanti
(74) *Attorney, Agent, or Firm*—Westerman, Hattori, Daniels & Adrian, LLP.

(57) ABSTRACT

A server system includes a digital camera lent out to a tourist and a server. Photographed image data photographed by the tourist with the digital camera is fetched by a main body of the server when a memory card is attached to a card reader of the server. The main body creates an Internet homepage based on the fetched photographed image data, and receives a print order of the photographed image from a homepage viewer through the Internet.

8 Claims, 9 Drawing Sheets

SERVER SYSTEM AND IMAGE MANAGEMENT METHOD THEREOF

BACKGROUND OF THE INVENTION

1. Field of the Invention

The present invention relates to a server system and an image management method thereof. More specifically, the present invention relates to a server system and an image management method thereof which manages image data photographed by a tourist with a rental digital camera.

2. Description of the Prior Art

When a tourist wishes to photograph a picture in a tourist site, he prepares a camera before departure and carries it until he reaches the site. However, if the tourist has to prepare the camera before departure, it is necessary to carry the camera all through the travel itinerary, thus resulting in a problem that his baggage takes up spaces.

SUMMARY OF THE INVENTION

Therefore, it is a primary object of the present invention to provide a novel server system and an image management system thereof.

It is another object of the present invention to provide a server system and an image management method thereof capable of viewing images photographed by himself without preparing a camera on his own.

According to the present invention, a server system which manages photographed image data photographed by a tourist with a rental digital camera, comprises: a fetcher for fetching the photographed image data; and a creator for creating a homepage of the Internet on which a photographed image is published based on the photographed image data fetched by the fetcher.

The photographed image data photographed by the tourist with the rental digital camera is fetched by the fetcher. The creator creates a homepage of the Internet on which a photographed image is published based on the fetched photographed image data. Since the camera is lent out, the tourist needs not to prepare a digital camera on his own. Furthermore, the photographed image photographed by the digital camera is published on the Internet homepage, thus possible to view the photographed image through the Internet.

Note that it may be possible to receive a print order of the photographed image through the Internet from an Internet viewer.

In a case that there are a plurality of tourists and a part of the tourists possesses a digital camera, the fetcher may fetch the photographed image data of the digital camera possessed by the tourist.

It is preferred that the photographed image include index information, and the index information is detected by a detector.

The detected index information may be used for statistics of the photographed image, and also used for determining a publishing position of the photographed image. In addition, it may be also possible that the index information sent from the viewer be accepted, and the photographed image corresponding to the accepted index information be detected from the homepage.

Note that it is preferred that the index information include at least one of a photographing location and a photographing time.

In a case that the location information is received by a receiver from the rental digital camera, it may be appropriate that guide information associated with the received location information be sent to the rental digital camera.

According to the present invention, an image managing method of a server system which manages photographed image data photographed by a tourist with a rental digital camera, comprises steps of: (a) fetching the photographed image data; and (b) creating a homepage of the Internet on which a photographed image based on the fetched photographed image data is published.

The photographed image data photographed by the tourist with the rental digital camera is fetched by a server system. The server system creates an Internet homepage on which the photographed image based on the fetched photographed image data is published. That is, the photographed image photographed by the rental digital camera is published on the Internet homepage. Accordingly, it is possible to view the image photographed by himself without preparing a camera on his own.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
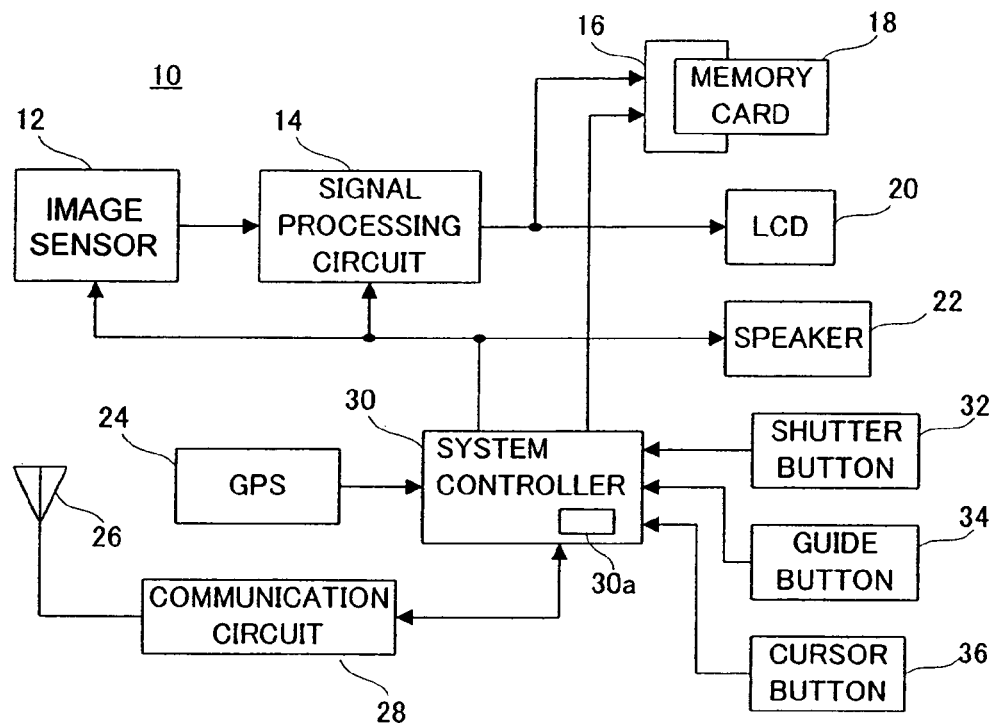
FIG. 1 is a block diagram showing a constitution of a rental digital camera.

In a print service business of this embodiment, a plurality of digital cameras 10, 10, . . . each of which is shown in FIG. 1 are lent out to group tourists who visit a tourist site, photographed images photographed by tourists at arbitrary locations by using each digital camera 10 are published on an Internet homepage, and a print order of the photographed images is later received from the tourists who gain access to the homepage. Herein, a lending and a collecting of the digital camera 10 take place at a tourist information center. Furthermore, a creation of the homepage on which the photographed images are published is carried out by a server 40 shown in FIG. 2. In addition, in a case that one of the group tourists possesses a digital camera, and requests to publish an image photographed by his own digital camera, the photographed image is also published on the homepage.

Referring to FIG. 1, if a tourist presses a shutter button 32 of the digital camera 10 at an arbitrary location, a system controller 30 applies a photographing command to an image sensor 12, and detects a present location and a present time, respectively by a GPS apparatus 24 and a clock circuit 30a. The image sensor 12 in receipt of the photographing command photographs an object, and outputs a photographed image signal. The outputted photographed image signal is subjected to a signal process such as a JPEG compression process, etc. by a signal processing circuit 14, and a compressed image signal is thereby generated. The system controller 30 creates an image file including the compressed image signal generated by the signal processing circuit 14, the location information and the time information detected by himself, and his own camera ID within a memory card 18.

Note that the memory card 18 is a detachable recording medium, and connected to the signal processing circuit 14 and the system controller 30 via a slot 16. Furthermore, the camera ID is used for identifying by which digital camera 10 the corresponding image is photographed.

Figure 2:
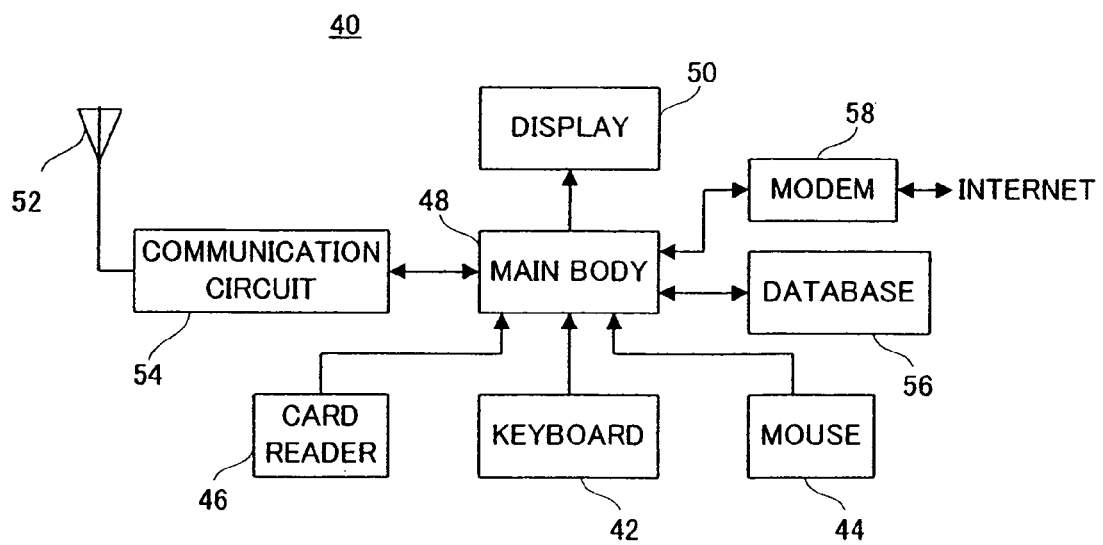
FIG. 2 is a block diagram showing a constitution of a server system.

In addition, if the tourist presses a guide button 34 at an arbitrary location, the system controller 30 detects the present location by the GPS apparatus 24, and sends the detected location information to the server 40 shown in FIG. 2 through a communication circuit 28 and an antenna 26. The location information is applied to a main body 48 of the server 40 through an antenna 52 and a communication circuit 54. The main body 48 specifies the digital camera 10, e.g. the location of the tourist by the received location information, and searches guide information from a database 56, such as a renowned architecture, a famous restaurant, etc. present in a vicinity of the specified location. If the guide information is obtained, the main body 48 sends back the guide information to the digital camera 10 through the communication circuit 54 and the antenna 52. The guide information is applied to the system controller 30 through the antenna 26 and the communication circuit 28 shown in FIG. 1. The system controller 30 outputs the applied guide information from an LCD 20 and a speaker 22.

When the tourist lends back the digital camera 10 to the tourist information center after finishing sightseeing, a staff of the tourist information center withdraws the memory card 18 from the digital camera 10, and attaches the withdrawn memory card 18 to a card reader 46 shown in FIG. 2. The main body 48 reads out the image file from the memory card 18, saves the photographed image data included in the image file into the database 56 as homepage publishing-use image data, and then saves the location information, the time information and the camera ID included in the image file into the database 56 as searching and statistics-use data. In addition, the main body 48 urges through a display 50 to input desired user information, and saves the inputted user information into the database 56 as the searching and statistics-use data. The searching and statistics-use data is saved in the database 56 in a state to be assigned to the corresponding homepage publishing-use image data. Note that with respect to the user information, there are a gender, a name of an individual person, a class name (in a case of a school excursion trip), a generation (in a case of a packaged tour), etc.

In a case that one of the tourists requests to publish the photographed image photographed with his own digital camera, the staff also attaches a memory card of the digital camera to the card reader 46. The main body 48 also saves the photographed image data and the time data included in the image file of the memory card in the database 56 as the homepage publishing-use image data and the searching and statistics-use data. Note that a digital camera owned by an individual person is not generally provided with a location searching function and a function of adding the camera ID to the image file. Accordingly, the location information and the camera ID are not included in the searching and statistics-use data.

When the file saving process into the database 56 is thus completed, the main body 48 issues a password, and creates a homepage for publishing the saved photographed image data. Herein, the password is issued to each tourist group, and the homepage is likewise created for each tourist group. Note that the main body 48 is connected to a communication network such as the Internet, etc. via a modem 58.

Figure 3:
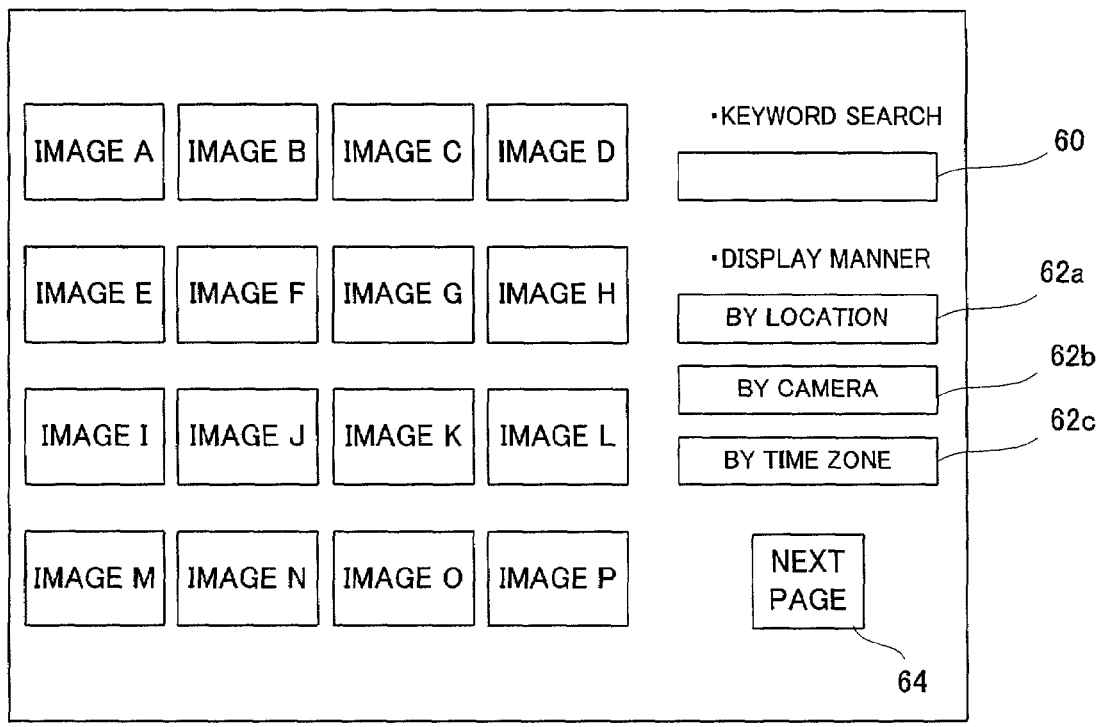
FIG. 3 is an illustrative view showing one example of a front screen displayed on a display of an access source.

When a tourist (operator) who has come back home gains access to the server 40 via the Internet, and enters the password, a front screen of the homepage as shown in FIG. 3 is displayed on a display of a communication terminal operated by the operator. According to FIG. 3, a plurality of the photographed images A~P (all reduction images) are displayed at an approximately left of a center of the screen, and an input column 60 for a keyword search, menus 62a~62c for changing a display manner of the photographed images, and a menu 64 for displaying a next page are displayed on a right side of the screen.

Herein, if the operator inputs an arbitrary keyword in the input column 60, an image searching by the keyword is carried out. If the inputted keyword is a name of an individual person, the photographed image data associated with the searching and statistics-use data including the name is searched from the database 56. On the display, the photographed image based on the found photographed image data is displayed.

Furthermore, if the operator clicks the menu 62a indicating "BY LOCATION", the photographed images to be displayed are sorted according to locations, if the operator clicks the menu 62b indicating "BY CAMERA", the photographed images to be displayed are sorted according to cameras, and if the operator clicks the menu 62c indicating "BY TIME ZONE", the photographed images to be displayed are sorted according to time zones. The sorting according to locations is carried out based on the location information included in the searching and statistics-use data, the sorting according to cameras is carried out based on the camera ID included in the searching and statistics-use data, and the sorting according to time zones is carried out based on the time information included in the searching and statistics-use data. Note that in the sorting according to cameras or according to locations, an image photographed by a digital camera owned by an individual person is placed at a rear end.

Figure 4:
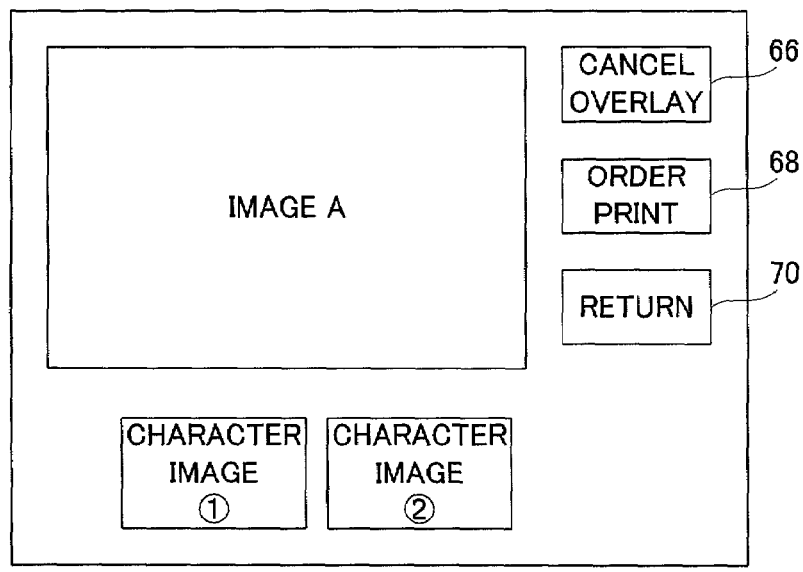
FIG. 4 is an illustrative view showing one example of a processing screen displayed on the display of the access source.

Furthermore, if the operator clicks a desired photographed image, the front screen shown in FIG. 3 is renewed to a processing screen shown in FIG. 4. According to FIG. 4, the selected photographed image (enlarged image) is displayed at an approximately upper left of a center of the screen, and character images ① and ② (all reduction images) are displayed at a lower side of the photographed image, and three menus 68, 70, and 72 are displayed on a right side of the photographed image. Note that a resolution of the photographed images displayed on the processing screen is lower than the resolution of the photographed image data saved in the database 56.

Herein, if the operator clicks either character image ① or ②, an enlarged image of the selected character image is displayed on the photographed image in an overlaying manner. The overlay display is cancelled by clicking the menu 66 indicating "CANCEL OVERLAY". Furthermore, if the operator clicks the menu 70 indicating "RETURN", the display screen is returned to the front screen shown in FIG. 3 from the processing screen shown in FIG. 4. If another photographed image is selected in the front screen, the selected photographed image is displayed as shown in FIG. 4.

If the operator clicks a menu indicating "ORDER PRINT" in a state where the character image is displayed in an overlaying manner on the photographed image or no character is overlaid on the photographed image, the display screen is renewed to an order forwarding procedure screen (not shown). The print order forwarding procedure is completed by inputting necessary items in the renewed order forwarding procedure screen and sending the inputted items to the server 40. A provider who provides a print service business prints the desired photographed images on a photographic paper by the desired number in accordance with the items inputted according to the print order forwarding procedure, and sends the printed photographs to an address included in the inputted items.

If the provider of the print service business wishes to collect statistics regarding the image data registered in the database 56, it may well instruct a statistics process by a keyboard 42. Then, the main body 48 calculates how many images are photographed in which place, and how many digital cameras 10, 10 . . . . were used in which place, and in addition, classifies these calculation results by time zone, the gender, and the generation (classes). Classifying results are displayed on the display 50.

Figure 5:
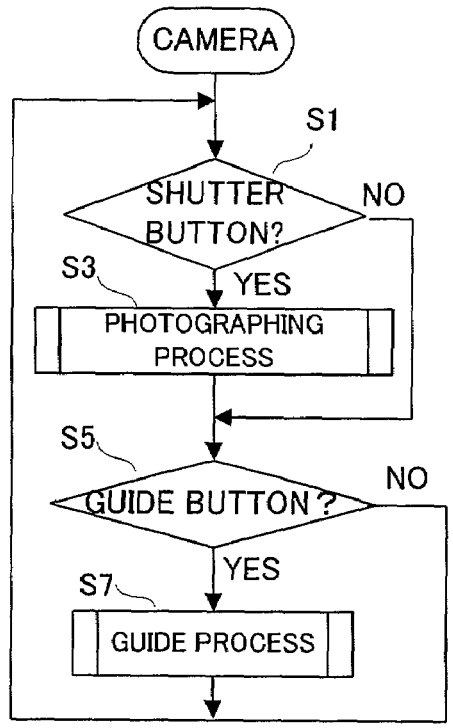
FIG. 5 is a flowchart showing one part of an operation of the rental digital camera.
Figure 6:
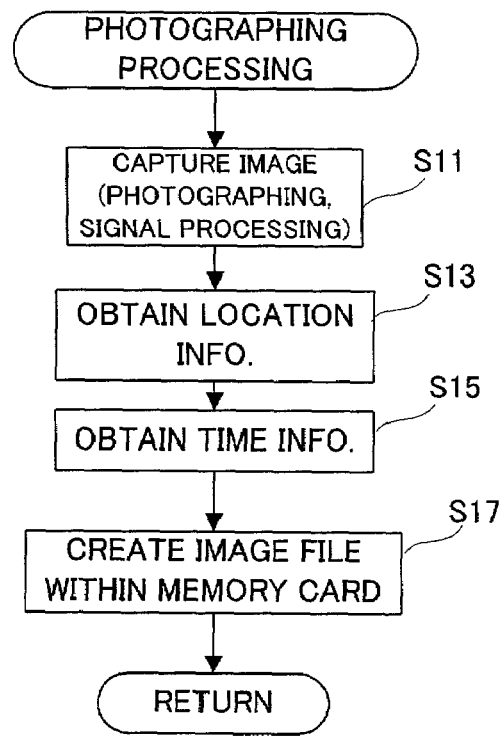
FIG. 6 is a flowchart showing another part of the operation of the rental digital camera.
Figure 7:
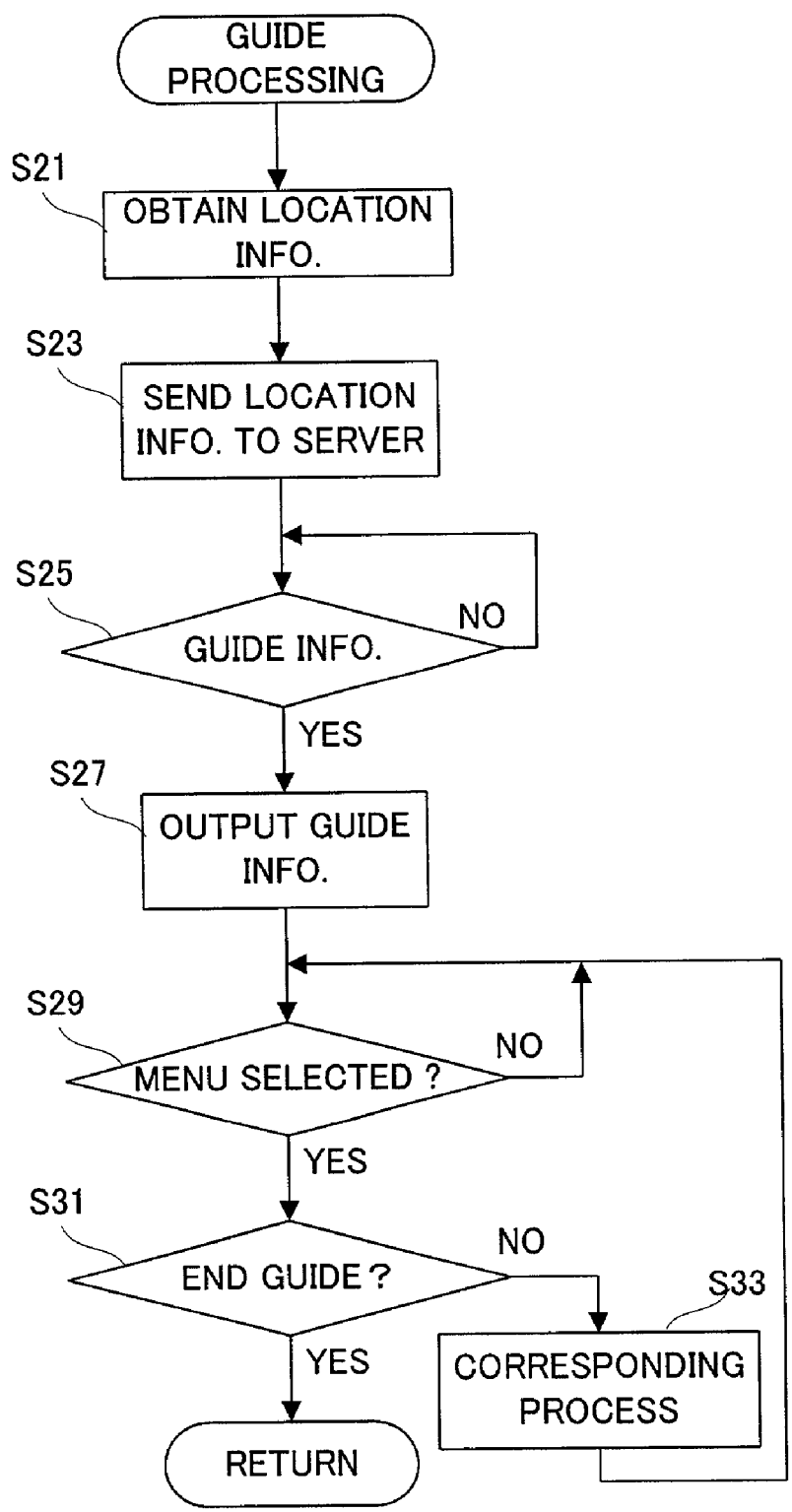
FIG. 7 is a flowchart showing the other part of the operation of the rental digital camera.

The system controller 30 of the digital camera 10 shown in FIG. 1, more specifically, carries out flowcharts shown in FIGS. 5 to 7. Firstly, it is determined whether or not the shutter button 32 is operated in a step S1. If NO is determined, the process directly proceeds to a step S5, however, if YES is determined, the process proceeds to the step S5 via a photographing process in a step S3. It is determined whether or not a guide button 34 is operated in the step S5. If NO is determined, the process returns to the step S1, however, if YES is determined, a guide process is carried out in a step S7. Upon completion of the guide process, the process returns to the step S1.

The photographing process in the step S3 follows a subroutine shown in FIG. 6. Firstly, an image capturing is carried out in a step S11. More specifically, the image sensor 12 and the signal processing circuit 14 are respectively given instructions to photograph a still image and process a signal. The photographed image signal is thereby outputted from the image sensor 12, and a compressed image signal based on the photographed image signal is generated by the signal processing circuit 14. Location information is obtained by driving the GPS apparatus 24 in a step S13, and time information is obtained by referring to a time circuit 30a in a step S15. When the compressed image signal, the location information, and the time information are thus obtained, the process proceeds to a step S17 so as to create an image file including the compressed image signal, the location information, the time information, and his own ID information within the memory card 18. Upon completion of the step S17 process, the process returns to a routine on a higher hierarchy.

A guide process in the step S7 follows a subroutine shown in FIG. 7. Firstly, location information is obtained by the GPS apparatus 24 in a step S21, and the obtained location information is sent to the server 40 in a step S23. The location information is transmitted to the server 40 through the communication circuit 28 and the antenna 26. Since the server 40 sends back guide information in response to the sent location information, it is determined whether or not the guide information is received in a step S25. If the guide information is applied through the antenna 26 and the communication circuit 28, the process proceeds from the step S25 to a step S27, and the applied guide information is outputted from the LCD 20 and the speaker 22. The guide information is conveyed to a tourist by virtue of images and voices.

There are a plurality of menu items on a guide screen displayed on the LCD 20, and it is determined whether or not a menu item is selected in a step S29. If any one of items is selected, the process proceeds from the step S29 to a step S31, then a content of the selected item is determined. If any item other than "END GUIDE" ("TURN PAGE", for example) is selected, the process returns to the step S29 after carrying out a corresponding process in a step S33. However, if "END GUIDE" is selected, the process returns to a routine on a higher hierarchy.

The main body 48 of the server 40 shown in FIG. 2, more specifically, carries out flowcharts shown in FIGS. 8 to 13. Firstly, it is determined whether or not a file saving operation is carried out in a step S41, if NO is determined, the process directly proceeds to a step S45. However, if YES is determined, the process proceeds to the step S45 after carrying out the file saving process in a step S43. It is determined whether or not there is an access (homepage viewing request) through the Internet in the step S45, and if NO is determined, the process directly proceeds to a step S49. However, if YES is determined, the process proceeds to the step S49 after carrying out a viewing process in a step S47.

It is determined whether or not location information (guide request) is sent from the digital camera 10 in the step S49, and if NO is determined, the process directly proceeds to a step S53. However, if YES is determined, the process proceeds to the step S53 after carrying out a guide process in a step S51. It is determined whether or not a statistics operation is carried out in the step S53, and if NO is determined, the process directly returns to the step S41. However, if YES is determined, the process returns to the step S41 after carrying out a statistics process in a step S55.

Figure 9:
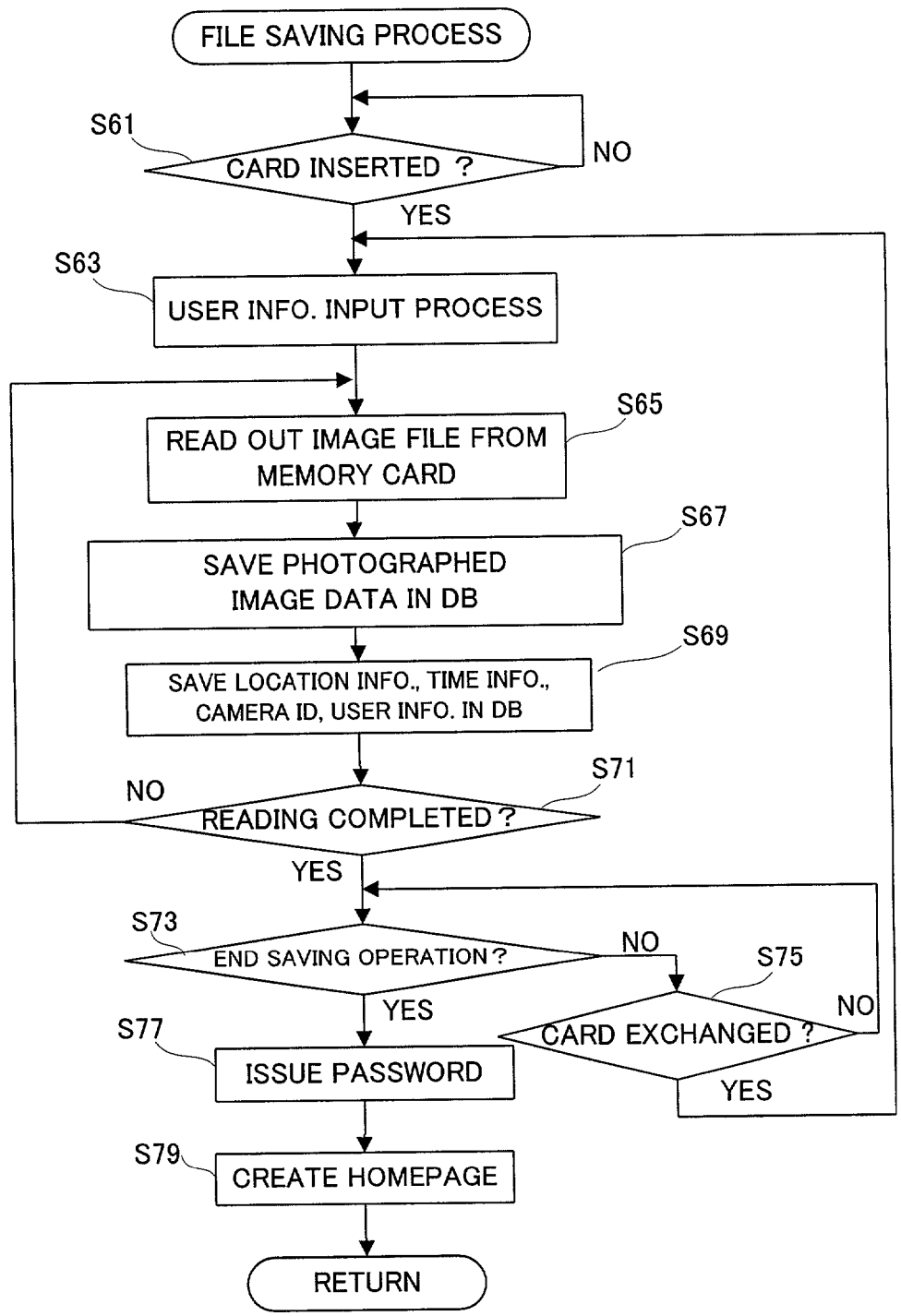
FIG. 9 is a flowchart showing another part of the operation of the server system.

The file saving process in the step S43 follows a subroutine shown in FIG. 9. It is determined whether or not the memory card 18 is inserted into the card reader 46 in a step S61, and if YES is determined, an input process of user information is carried out in a step S63. More specifically, the input of user information such as a generation (class name), a gender, an individual person's name, etc. is guided, and upon completion of the input, the process proceeds to a step S65.

One image file is read out from the memory card 18 in the step S65, and the photographed image data included in the read image file is saved in the database 56 as the homepage publishing-use image data in a step S67. Location information, time information, and a camera ID included in the same image file and the user information inputted in the step S63 are saved in the database 56 as the searching and statistics-use data in a step S69. At this time, the searching and statistics-use data is brought into being associated with the photographed image data saved in the immediately preceding step S67.

It is determined whether or not all of the image files are read out from the memory card 18 in a step S71, and if YES is determined, the process proceeds to a step S73. However, if NO is determined, the processes of steps S65 to S69 are repeated. It is determined whether or not an end saving operation is carried out in a step S73, and it is determined whether or not the memory card 18 is exchanged in a step S75. When the end saving operation is carried out, the process proceeds from the step S73 to a step S77, however, if the memory card 18 is exchanged, the processes of steps S63 to S71 are repeated. Therefore, in the searching and statistics-use data brought into being associated with the photographed image data in the step S69, the location information and the time information are different depending on each photographed image, on the other hand, the camera ID and the user information are different depending on each memory card 18. Note that the searching and statistics-use data may be defined as index information.

A password necessary for a viewing process via the Internet is issued in the step S77, and a homepage is created in a step S79. On the created homepage, the photographed images saved in the step S67 in association with the file saving process of this time are published, and in addition, the password issued in the step S77 is assigned.

Figure 10:
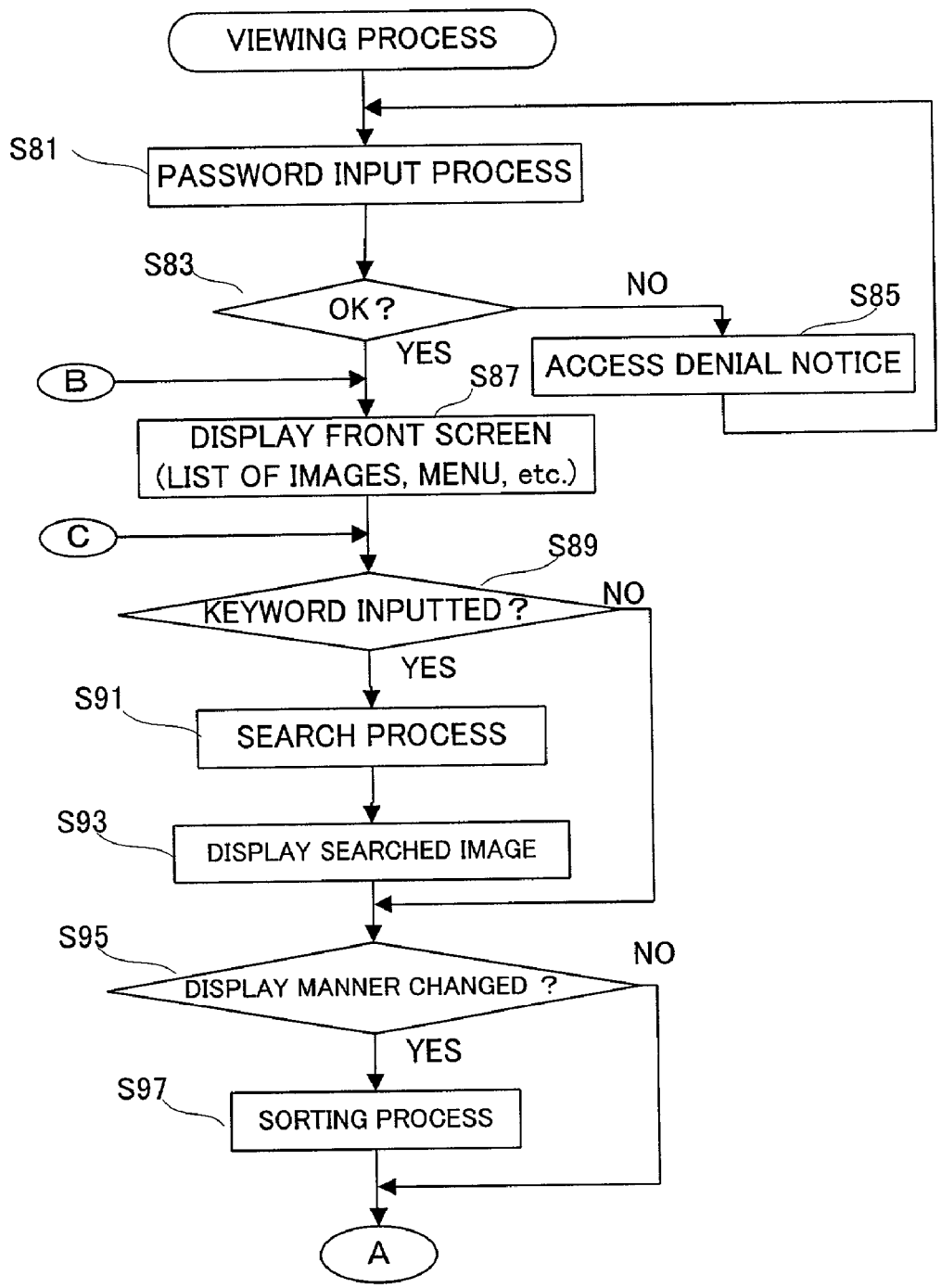
FIG. 10 is a flowchart showing the other part of the operation of the server system.
Figure 11:
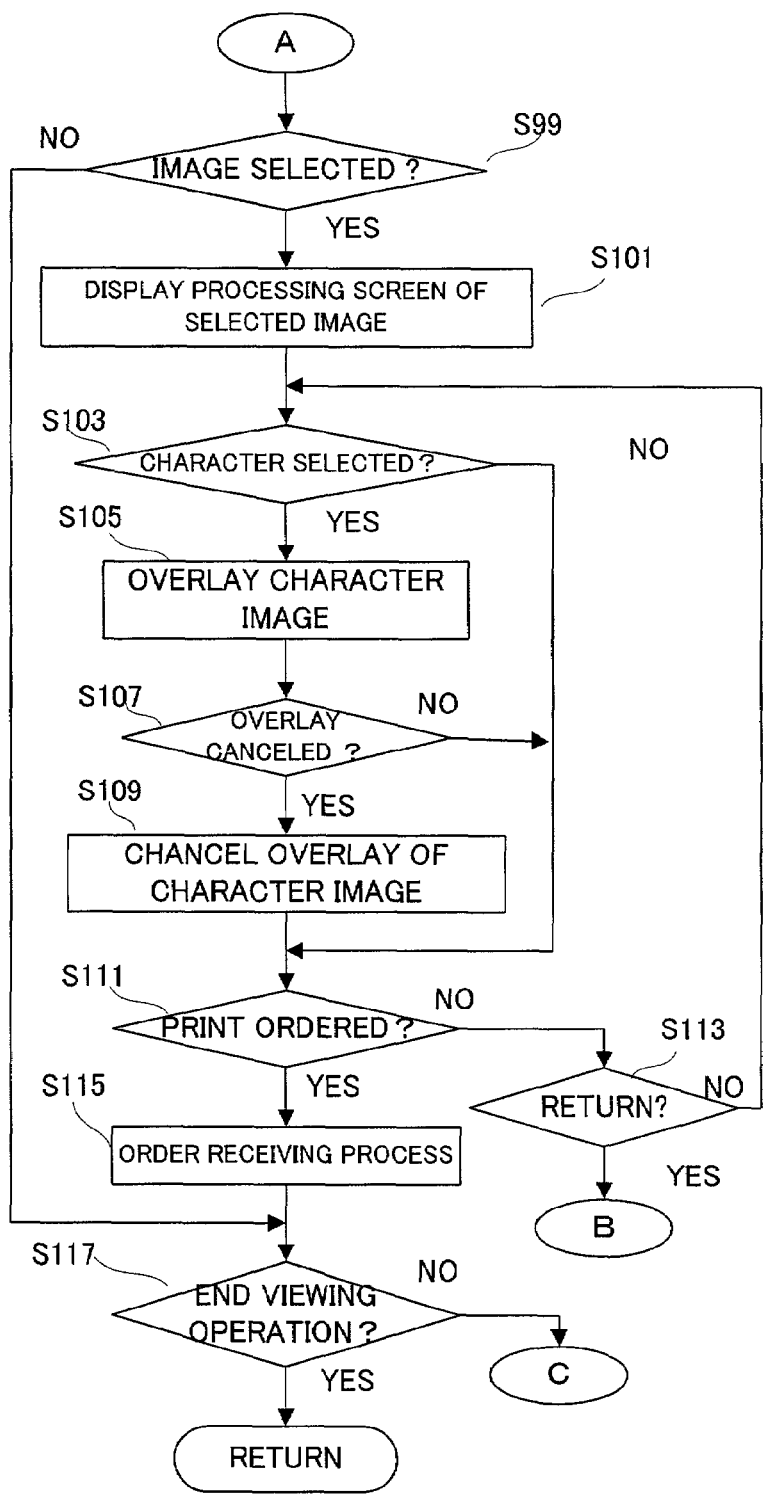
FIG. 11 is a flowchart showing further part of the operation of the server system.

The viewing process in the step S47 follows subroutines shown in FIGS. 10 and 11. Firstly, it is requested to input the password in a step S81, and in a succeeding step S83, a verification of the inputted password is determined. If the password is not correct, a denial notice is sent to an access source in a step S85, and the process returns to the step S81. On the other hand, if the inputted password is correct, the process proceeds from the step S83 to a step S87, and the front screen data of the homepage to which the same password is assigned is sent to the access source. On a display of the access source, a front screen shown in FIG. 3 is displayed.

It is determined whether or not a keyword is received from the access source in a step S89, if YES is determined, a keyword search is carried out in a step S91. If the inputted keyword is the gender, the photographed image data brought into being associated with the searching and statistics-use data including the same gender is searched from the database 56. The photographed image data found is sent to the access source in a step S93. On the display of the access source, a plurality of the photographed images corresponding to the inputted keyword are displayed.

If NO is determined in the step S89, or upon completion of the process of the step S93, it is determined whether or not a changing operation of a displaying manner is carried out in a step S95. If any one of the menus 62*a* to 62*c* shown in FIG. 3 is clicked at the access source, YES is determined in the step S95, and a sorting process is carried out in a step S97. That is, if the menu 62*a* indicating "BY LOCATION" is clicked, the photographed images are sorted by locations, if the menu 62*b* indicating "BY CAMERA" is clicked, the photographed images are sorted by cameras, and if the menu 62*c* indicating "BY TIME ZONE" is clicked, the photographed images are sorted by time zones.

If NO is determined in the step S95, or upon completion of the step S97 process, it is determined whether or not any one of the photographed images is selected in a step S99. If any one of the photographed images shown in FIG. 3 is selected, YES is determined in this step, and the processing screen data including the selected photographed image is sent to the access source. On the display of the access source, a processing screen shown in FIG. 4 is displayed.

It is determined whether or not the character image ① or ② is clicked at the access source in a step S103. If NO is herein determined, the process proceeds to a step S111. However, if YES is determined, the process proceeds to a step S105 so as to overlay the clicked character image on the photographed image. In a succeeding step S107, it is determined whether or not the menu 66 indicating "CANCEL OVERLAY" is clicked, and if NO is determined, the process directly proceeds to the step S111. However, if YES is determined, the process proceeds to the step S111 after canceling the overlay of the character image in a step S109. Note that, more specifically, the processing screen data in which the character image is overlaid on the photographed image is sent to the access source in the step S105, and the processing screen data in which the character image is not overlaid on the photographed image is sent to the access source in the step S109.

In respective steps of the S111 and a S113, it is determined whether or not the menu 68 indicating "ORDER PRINT" shown in FIG. 3 and the menu 70 indicating "RETURN" are clicked. Herein, if neither menu of 68 nor 70 is clicked, the process returns to the step S103 in order to carry out processes on the processing screen. If the menu 70 is clicked, the process returns to the step S87 in order to display the front screen, and if the menu 68 is clicked, the process proceeds to a step S115 so as to carry out an order receiving process. In the step S115, more specifically, procedure screen data for the print order is sent to the access source, and the necessary item data inputted by the access source is fetched.

Upon completion of the process in step S115, or if NO is determined in the step S99, it is determined whether or not an end viewing operation is carried out in a step S117. If NO is determined, the process returns to the step S89, and if YES is determined, the process returns to a routine on a higher hierarchy.

Figure 8:
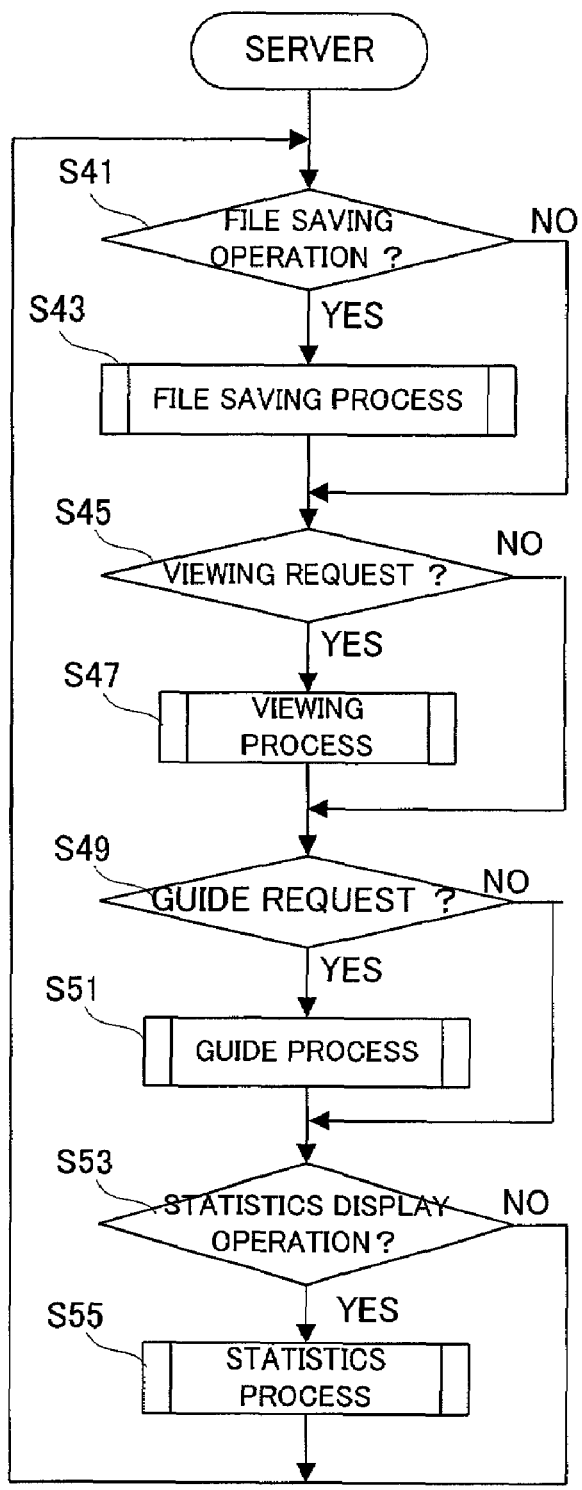
FIG. 8 is a flowchart showing one part of an operation of the server system.
Figure 12:
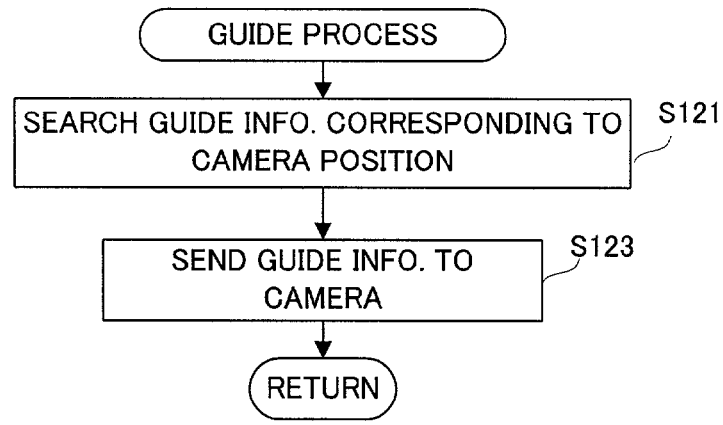
FIG. 12 is a flowchart showing another part of the operation of the server system.

A guide process in the step S51 shown in FIG. 8 follows a subroutine shown in FIG. 12. Guide information corresponding to the location information sent from the digital camera 10 is searched from the database 56 in a step S121, and the found guide information is sent to the digital camera 10 in a succeeding step S123.

Figure 13:
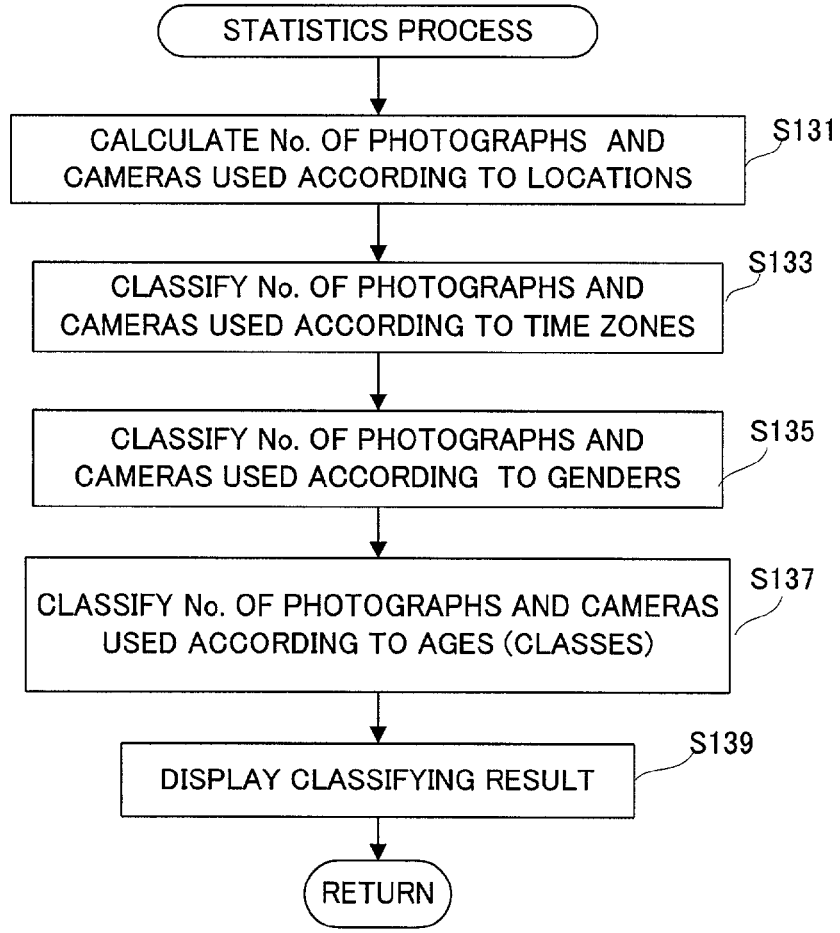
FIG. 13 is a flowchart showing the other part of the operation of the server system.

A statistics process in the step S55 shown in FIG. 8 follows a subroutine shown in FIG. 13. Firstly, the number of photographs and the number of the cameras used are calculated according to locations in a step S131. The calculation of the number of photographs is carried out based on the location information, and the calculation of the number of cameras used are carried out based on the location information and the camera ID. The calculated number of photographs and the number of cameras used are classified according to time zones in a step S133, and the calculated number of photographs and the number of the cameras used are classified according to genders in a step S135, and the calculated number of photographs and the number of cameras used are classified according to ages (or according to classes) in a step S137. Upon completion of the step S137 process, classification results are displayed on the display 50 in a step S139, and the process returns to a routine on a higher hierarchy later.

As understood from the above descriptions, the photographed image data photographed by the tourist with the digital camera 10 are fetched by the main body 48 when the memory card 18 is attached to the card reader 46 of the server 40. The main body 48 creates an Internet homepage based on the fetched photographed image data, and receives an order of the prints of the photographed images through the Internet from homepage viewers. Since the digital camera 10 is lent out to the tourist, the tourist needs not to prepare the digital camera on his own. Furthermore, since the photographed images photographed by the digital camera 10 are published on the Internet homepage, it is possible to order the prints of the photographed images through the Internet. That is, it is possible to obtain photographs taken by himself without preparing a camera on his own.

Note that although in this embodiment, common user information is brought into being associated with the photographed images read out by the same memory card, it may be possible that the user information be associated according to each photographed image.

Furthermore, in this embodiment, one server carries out a plurality of processes such as managing the photographed images, receiving a print order, etc., it is possible that the processes be dispersed to respective servers by forming one server system by a plurality of servers arranged in distant locations with each other.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system which manages photographed image data captured during photography with a digital camera, comprising:
   a digital camera that captures digital image data during photography, creates an image file including said captured digital image data and index information related to a capturing process of the digital camera, and stores said image file, wherein said index information includes at least location information indicating a location of the camera and time information indicating a time of capturing the digital image, wherein the location information is determined using a GPS; and
   a server, the server comprising
   a fetcher for fetching said image file and data identifying a user of the digital camera,
   a first creator for creating a searchable database of said index information,
   a second creator for creating an Internet homepage on which said captured digital image data is published and for creating a user password required to access the Internet homepage, the Internet homepage and the user password being created in response to the fetcher fetching said image file and said data identifying the user of the digital camera,
   a detector for detecting said index information from said image file, and
   a determiner for determining a publishing position of said captured digital image data on said Internet homepage based on sorting the images with reference to the location information and the time information included in said index information detected by said detector.

2. A system according to claim 1, wherein said server further comprises an order receiver for receiving a print order of said captured digital image data through said Internet from a viewer of said homepage.

3. A system according to claim 1, further comprising at least a second digital camera and said fetcher also fetches captured digital image data of said at least the second digital camera.

4. A system according to claim 1, wherein said server further comprises a statistics collector for collecting statistics of said captured digital image data based on said index information detected by said detector.

5. A system according to claim 1, wherein said server further comprises:
   an acceptor for accepting said index information sent from a viewer of said homepage; and
   a searcher for searching from said homepage captured image data corresponding to said index information accepted by said acceptor.

6. A system according to any one of claims 1-3, 4 and 5, wherein said index information includes at least one of a location at which a photograph is taken and a time at which a photograph is taken.

7. A system according to claim 1, wherein said server further comprises:
   a receiver for receiving location information from said digital camera; and
   a sender for sending to said digital camera guide information associated with said location information for guiding a user of the digital camera.

8. An image managing method which manages by a server photographed image data captured during photography with a digital camera, said image managing method comprising steps of:
   capturing digital image data during photography;
   creating an image file including said captured digital image data and index information related to a capturing process of the digital camera, wherein said index information includes at least location information indicating a location of the camera and time information indicating a time of capturing the digital image, wherein the location of the camera is determined using a GPS; and
   storing said image file; and
   fetching said image file and data identifying the user of the digital camera;
   creating a searchable database of said index information; and
   creating an Internet homepage on which said captured digital image data is published and creating a user password required to access the Internet homepage, the Internet homepage and the user password being created in response to fetching of said image file and the data identifying the user of the digital camera,
   detecting said index information from said image file, and
   determining a publishing position of said captured digital image data on said Internet homepage based on sorting the images with reference to the location information or the time information included in said index information detected.

* * * * *